Sept. 29, 1970 F. KOCH ET AL 3,530,731
INDEXING MEANS FOR INJECTION MOLDING MACHINE
Filed Feb. 7, 1969 5 Sheets-Sheet 1
FIG. 1
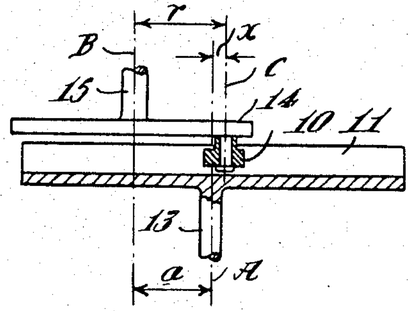
FIG. 3
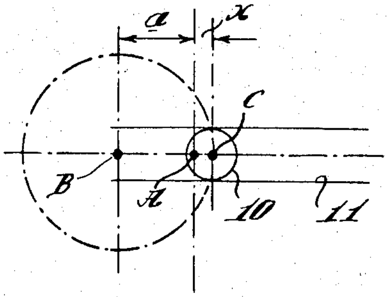
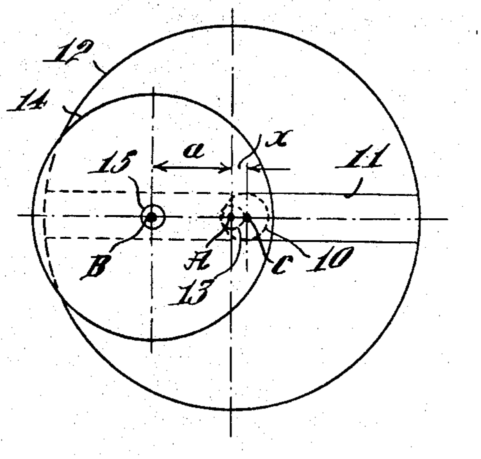
FIG. 2
FIG. 4
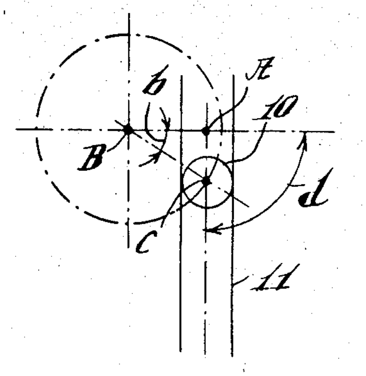
FIG. 5
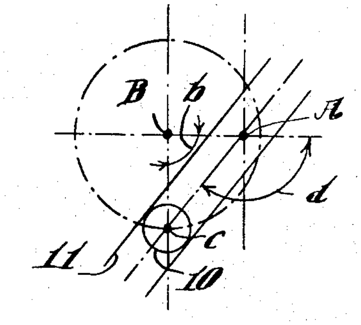
INVENTORS
Lothar Fink
Friedrich Koch
by Atty

INDEXING MEANS FOR INJECTION MOLDING MACHINE

Filed Feb. 7, 1969 5 Sheets-Sheet 3

INDEXING MEANS FOR INJECTION MOLDING MACHINE

INDEXING MEANS FOR INJECTION MOLDING MACHINE

Filed Feb. 7, 1969

United States Patent Office 3,530,731
Patented Sept. 29, 1970

1

3,530,731

INDEXING MEANS FOR INJECTION MOLDING MACHINE

Friedrich Koch, Achim, near Bremen, and Lothar Fink, Baden, Kreis Verden, Germany, assignors to Desma-Werke Gesellschaft mit beschrankter Haftung, Uesen, near Bremen, Germany Filed Feb. 7, 1969, Ser. No. 797,417
Claims priority, application Germany, Feb. 21, 1968, 1,650,675
Int. Cl. F16h *21/14*
U.S. Cl. 74—69 17 Claims

ABSTRACT OF THE DISCLOSURE

A horizontally disposed table supported for rotation about a vertical axis and indexing means for stepping the table around at predetermined intervals, comprising spaced parallel input and output shafts, and driving means connecting said shafts for transforming uniform rotation of the input shaft to non-uniform intermittent rotation of the output shaft, said means embodying a diametrically disposed guide fast to one shaft, a drive elecent constrained to move linearly along the guide and angularly with the guide about the axis of the input shaft when the latter is rotated, means operably connecting the drive element to the output shaft so that the combined linear and angular movement of the drive element will impart rotation to the output shaft, means drivably connecting the output shaft to the table, and means on the input shaft adapted to impart uniform rotation thereto.

Background of the invention

The invention is concerned primarily with a drive for injection molding machines of the kind provided with a large horizontally disposed table rotatable about a vertical axis upon which are mounted at uniformly spaced intervals a plurality of molds adapted to be presented successively to one or more injection stations, supported adjacent the periphery of the table, by intermittent rotation of the table. The weight of the table and molds is high and in order to overcome the inertial resistance of the mass to starting and stopping as the table is indexed, step-by-step, smoothly and without excessive stress on the driving mechanism Maltese-cross gearing has been used heretofore. This type of gearing provides for intermittent rotation with gradually increasing and decreasing speed during each step of rotation. However, it has specific limitations and while quite satisfactory for effecting intermittent rotation where the table is stepped around through six or more steps, it is not practical and cannot be successively used where the table is stepped around fewer than six steps.

Objects of this invention are to provide a harmonic drive similar to the Maltese-cross drive but without its disadvantages to provide a device having a precise dwell position between steps in contrast to the Maltese-cross drive which does not have a precise zero position of dwell; to provide a device for obtaining a precise period of dwell without complicated mechanism and added costs; and to provide a device which, by reason of its precise periods of dwell, is adapted to be more accurately controlled and hence affords smoother operating conditions.

Summary

The invention consists in that between the preferably uniformly rotating drive input and the nonuniform rotating drive output a drive journal is arranged which is displaceably guided in a rotating slot guide and during the drive movement has a varying distance at least from the axis of rotation of the slot guide. The distance of the

2 drive journal from the other axis of rotation of the gearing can be variable or invariable. By the variation of the distance of the drive journal from the axis of rotation of the slot guide a nonuniform transmission of the speed of rotation is achieved in such manner that at the beginning of the cadence the speed varies only to a slight extent, that is the acceleration is slight. After a certain range of revolution the speed increases by a very great amount, that is the acceleration is very great (approximately at 90° of the rotation cadence). Thereafter the acceleration decreases to the 180° position, then the acceleration becomes negative. By the completion of the revolution the (negative) acceleration again achieves a low value so that on the drive output side a very gradually retarding movement is achieved.

In the initial position of the gearing the drive journal has a minimum distance or no distance from the axis of rotation of the slot guide. In the course of the revolution the distance varies constantly up to a maximum value at 180°.

In one form of embodiment of the invention the drive journal has an invariable distance from the other axis of rotation, preferably on the drive output side. In this form of embodiment even when the drive input is stationary a minimum distance exists between the axis of rotation of the drive journal and the axis of rotation of the slot guide. This has the consequence that an actual, genuine zero position of the drive as in a Maltese-cross gearing does not exist.

In another form of embodiment of the invention which guarantees a genuine zero position of the gearing, the axis of rotation of the drive journal in the zero position coincides with the axis of rotation of the slot guide. In this form of embodiment the drive journal is also variable as regards the distance in relation to the axis of rotation on the drive output side. At the commencement of the drive movement firstly the drive journal is shifted in the slot guide by an intermediate gearing so that a distance of the drive journal from the axis of rotation of the slot guide is produced. Now the movement can proceed as in the other form of embodiment of the gearing.

A further especially advantageous form of embodiment of the invention, which also ensures a genuine zero position of the gearing, is distinguished by its especially simple assembly and by its reliable, precise manner of working. In the case of this gearing embodiment an expensive intermediate gearing is omitted. It is replaced by substantially simpler means for the drive of the gearing and the force transmission, which consist in that the drive roller is mounted on a movable holder, especially a carriage, which is movable by a guide roller running in a stationary guide, especially a guide groove, in such manner that at the commencement of a movement cadence the drive roller is movable by the carriage out of the position coaxially with the drive axis.

According to a further proposal the guide groove is arranged in a housing surrounding the gearing and the carriage, connected with the drive shaft and movable in relation thereto, is displaceable by a guide roller rotating in the guide groove.

In the two gearing embodiments which possess a genuine momentary zero position of the drive output, this is at the same time the beginning and the end of a rotation cadence of the rotary platform. During a nonuniform rotational movement of the drive output from the zero position into the zero position in each case an injection molding or vulcanizing station is moved into the working position, for example before an injection unit. In the working position the injecting molding or vulcanizing station is to remain for a certain period so that the necessary measures, especially the injection of the material or the withdrawal of the injection molding from the injection mold can be carried out.

During this period of halting of the rotary platform between two rotation cadences the gearing or the drive must be halted. This is effected due to the fact that a drive motor is switched off for the necessary period or is separated from the gearing through a clutch. Electric end switches which are actuated by cams, namely with the aid of the gearing according to the invention, are more expediently provided for switching off the drive motor or for actuation of the clutch.

While in Maltese-cross gearings usual hitherto for such purposes a relatively long stationary phase is caused by reason of design in the control gearing, and during this relatively long stationary phase the switching off of the drive motor can be effected, possibly with a certain time inaccuracy, in the control gearings according to the invention the genuine zero position of the gearing, that is to say the genuine halting of the drive output, exists only for an extremely brief moment. On the other hand it is very desirable to carry out the switching off of the drive motor as exactly as possible at the moment of the zero position of the drive output, so that the smoothest possible starting up and running down of the moving parts, namely of the rotary platform, are achieved.

It has appeared in practice that the ordinary end switches actuated by cams possess certain switching inaccuracies, for various reasons, especially by reason of the mechanical design. A problem upon which the invention is based consists now in effecting the switching off of the drive or of the drive motor as precisely as possible at the moment of the zero position of the gearing or of the drive output, despite the predetermined switching inaccuracy of the end switches.

To solve this problem it is provided that the end switch for the actuation of the drive motor is actuated by a cam arranged on the drive side and rotating with the drive.

The surprising advantage of this measure consists in that by the arrangement of a switch cam for the end switch on the drive side of the gearing the source of error due to the end switch is kept optimally small. On the drive output side the rotational distance travelled in the unit of time in the vicinity of the zero position of the gearing is relatively large, because in the vicinity of the zero position the movement of the output side proceeds relatively slowly. On the drive input side on the other hand a constant rotation speed is provided which in every case is higher than the speed of the rotational movements in the vicinity of the zero position on the drive output side. Thus the error due to the end switch is kept as small as possible, if according to the proposal the cam for the operation of the end switch is arranged on the drive input side, that is to say in the region of the constant, uniform speed of rotation.

The cam for the actuation of the end switch is preferably arranged on a cam disc on which further cams are arranged for the actuation of further switches and which is mounted on the drive input shaft of the gearing, rotating therewith.

A further problem upon which the invention is based consists in preventing breakages or other harmful effects in the gearing by reason of the considerable forces which occur on sudden braking of the considerable masses, if a sudden interruption of the rotational movement of the rotary platform should become necessary.

To solve this problem it is provided that on the drive input side a safety clutch adjustable to the necessary torque to be transmitted is installed, which interrupts the connection if a critical torque is exceeded.

As safety clutch a toothed clutch is preferably provided, the toothed jaws of which are elastically resiliently in engagement with one another.

The invention will be further explained hereinafter by means of examples of embodiment thereof with reference to the accompanying drawings wherein:

FIG. 1 shows a form of embodiment of the gearing according to the invention in diagrammatic lateral elevation;

FIG. 2 shows a diagrammatic plan view of FIG. 1;

FIGS. 3–5 show various diagrammatic positions of the gearing according to FIGS. 1 and 2;

Figure 6:
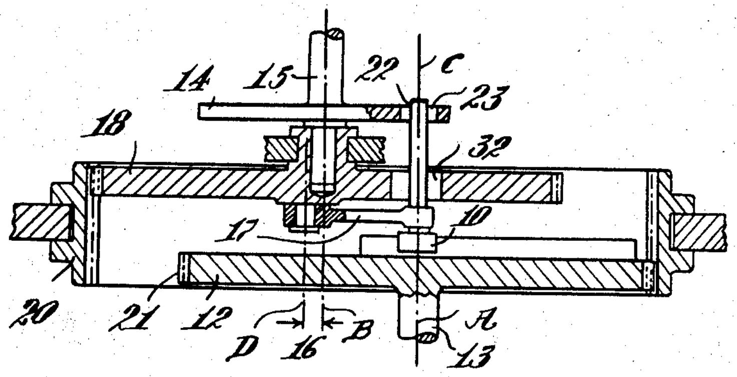
FIG. 6 shows another form of embodiment of the gearing in diagrammatic lateral elevation.

As shown in the drawings, the gearing according to the invention serves for the operationally synchronized drive of rotatable machine parts, especially of rotary platforms for automatic injection molding and vulcanizing machines. It is provided here that a uniform rotational drive is converted into a nonuniform rotational drive output with slight acceleration and retardation of the speed at the beginning and at the end of the movement cycle. This speed conversion takes place with the aid of a drive journal, especially a drive roller 10, which during the movement assumes a varying distance $x$ in relation to one of the axes of rotation, in relation to the rotation axis A on the drive input side in the examples of embodiment as illustrated. In relation to the rotation axis B on the drive output side the drive roller 10 in the example of embodiment according to FIGS. 1–5 has an invariable distance $r$. The distances are related in each case to the axis C of the drive roller.

On the drive input side a slot guide 11 equally rotating about the rotation axis A is provided. The drive roller 10 engages displaceably in this slot guide. In the example of embodiment according to FIGS. 1 and 2 the slot guide 11 is arranged on a drive disc 12 which is mounted on a drive input shaft 13.

The drive roller 10 is rotatably mounted on a drive output disc 14, namely in the example of embodiment according to FIGS. 1–5 with invariable distance from the rotation axis B of the drive output disc 14, which is mounted for example on a drive output shaft 15. The rotation axis A on the drive input side is at an invariable distance $a$ from the rotation axis B on the drive output side.

The uniform rotary drive of the drive input shaft 13 is transmitted through the intermediary of the slot guide 11 by the drive roller 10 to the drive output disc 14 and thus to the drive output shaft 15 and at the same time converted into a non-uniform rotary movement. The transmission of the drive is possible due to the fact that the drive roller 10 has a distance X from the rotation axis A of the drive input shaft 13 or the slot guide 11. In the initial position (driven rotary platform stationary) according to FIGS. 1–3, the drive roller 10 or its axis C has a minimum distance $x$ from the rotation axis A of the drive input side. On rotation of the slot guide 11 the drive output disc 14 is set in rotation by the drive roller 10 with lower acceleration than the drive input. With increasing rotation of the slot guide 11 and entraining of the drive roller 10, which then slides in the slot guide 11, the acceleration of the drive output disc 14 also increases. From FIG. 4 it can be seen that in the case of a rotation of the slot guide 11 out of the initial position according to FIGS. 2 and 3 through an angle $\alpha=90°$ into the position according to FIG. 4, the entrained drive output disc has on the other hand carried out a smaller rotation $\beta$, which is less than the rotation $\alpha$. Even in the position according to FIG. 5, where $\alpha$ that is the rotation of the slot guide 11, approaches the value 180°, the drive output disc 14 has carried out a smaller rotation $\beta$. However in this phase the acceleration of the drive output disc 14 has increased considerably. After execution of the half revolution at 180°, $\alpha$ and $\beta$ are of equal magnitude. In the further rotation to the initial position according to FIG. 3 the acceleration and speed characteristics of the drive output disc 14 are correspondingly reversed, that is to say in the vicinity of the initial position according to FIGS. 2 and 3 the drive output disc 14 has a slight retardation, so that the masses come gradually to a halt.

In the form of embodiment of the invention according to FIGS. 1 to 5, no genuine halting of the drive output disc takes place if the drive by the drive input shaft 13 is uninterrupted, since even in the initial position according to FIGS. 2 and 3 the drive roller 10 has a distance $x$ from the rotation axis A. For this gearing according to FIGS. 1 to 5 the equation $a+x=r$ is valid, where $x$ is selected as small as possible, but in every case must be greater than 0 in every position.

Figure 7:
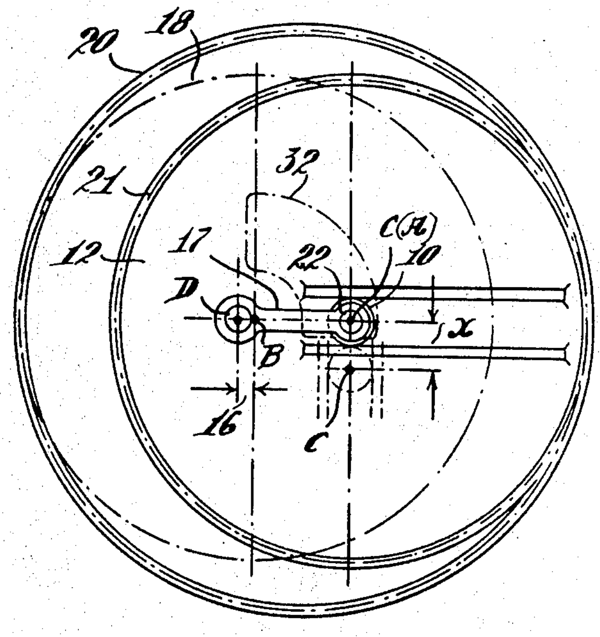
FIG. 7 shows a detail of FIG. 6 in plan view, on an enlarged scale.

In the form of embodiment according to FIGS. 6 and 7 the above equation is valid during the drive transmission. In the initial position according to FIG. 7 however with this gearing a genuine halt is achieved due to the fact that during this position the drive roller 10 or its axis C is coaxial with the rotation axis A on the drive input side. At the beginning of a rotation cadence firstly the drive roller 10 is moved out of this position $x=0$ by a special additional intermediate gearing, so that the drive roller 10 receives a distance from the rotation axis A. Now the uniform rotation drive can be transmitted from the drive input shaft 13 to a drive output disc 14 and the drive output shaft 15. Admittedly a somewhat modified characteristic of the speed or acceleration occurs due to the fact that the relative position between the drive roller 10 and the rotation axis B on the drive output side is variable during the drive.

The intermediate gearing, by which the drive roller 10 is moved out of the zero position according to FIGS. 6 and 7 at the beginning of driving, consists in the example of embodiment as illustrated of an eccentric 16 having an axis D of rotation which is eccentric in relation to the rotation axis B on the drive output side. The eccentric 16 is connected through a pivotable arm 17 with the drive roller 10. The eccentric 16 is mounted on a toothed wheel 18 which is rotatably mounted on the drive output shaft 15 coaxially with the drive output disc 14 and the drive output shaft 15. The toothed wheel 18 is in engagement with the internal toothing of a toothed ring 20. The latter again is driven by the drive input disc 12, provided with an external toothing 21. In departure from the previous example of embodiment, here the drive is transmitted from the drive roller 10 through an engaging member 22 to the drive output disc 14. On account of the movements of the drive roller 10 in relation to the drive output disc 14 the free end of the engaging member 22 engages in an elongated hole 23 of the drive output disc 14. The toothed wheel 18 is provided with a segment-type aperture 32 for the passage of the engaging member 22.

At the commencement of a rotation cadence the drive of the drive input disc 12 is first transmitted through the external toothing 21 to the toothed ring 20 and thence to the toothed wheel 18. Thus the toothed wheel 18 effects a rotation of the eccentric 16, whereby the original distance $r$ between the axis C of the drive roller 10 and the rotation axis B on the drive output side is varied, namely increased. At the same time the drive roller 10 travels out of the coaxial position in relation to the rotation axis A on the drive input side, so that a distance $x$ from the latter occurs. Since the drive of the drive input disc 12 and thus of the slot guide 11 continues, now with the occurrence of the distance $x$ the transmission of the drive to the drive output disc 14 through the engaging member 22 commences. In the further course of the rotation cadence a similar characteristic of the speed and acceleration on the drive output side are achieved as in the previous example of embodiment. The eccentric 16 is also rotated until finally it again reaches the initial position according to FIGS. 6 and 7. Thus at the end of a rotation cadence the gearing again receives a genuine zero position, since the axis C of the drive roller 10 is coincident with the rotation axis A on the drive input side.

However in the example of embodiment according to FIGS. 6 and 7 an improvement is obtained in comparison with the example of embodiment according to FIGS. 1 to 5 insofar as the accelerations at the beginning and end of the rotation cadence are small. Furthermore the maximum acceleration at 90° (position according to FIG. 4) is relatively small. Finally a genuine zero position is achieved.

Figure 8:
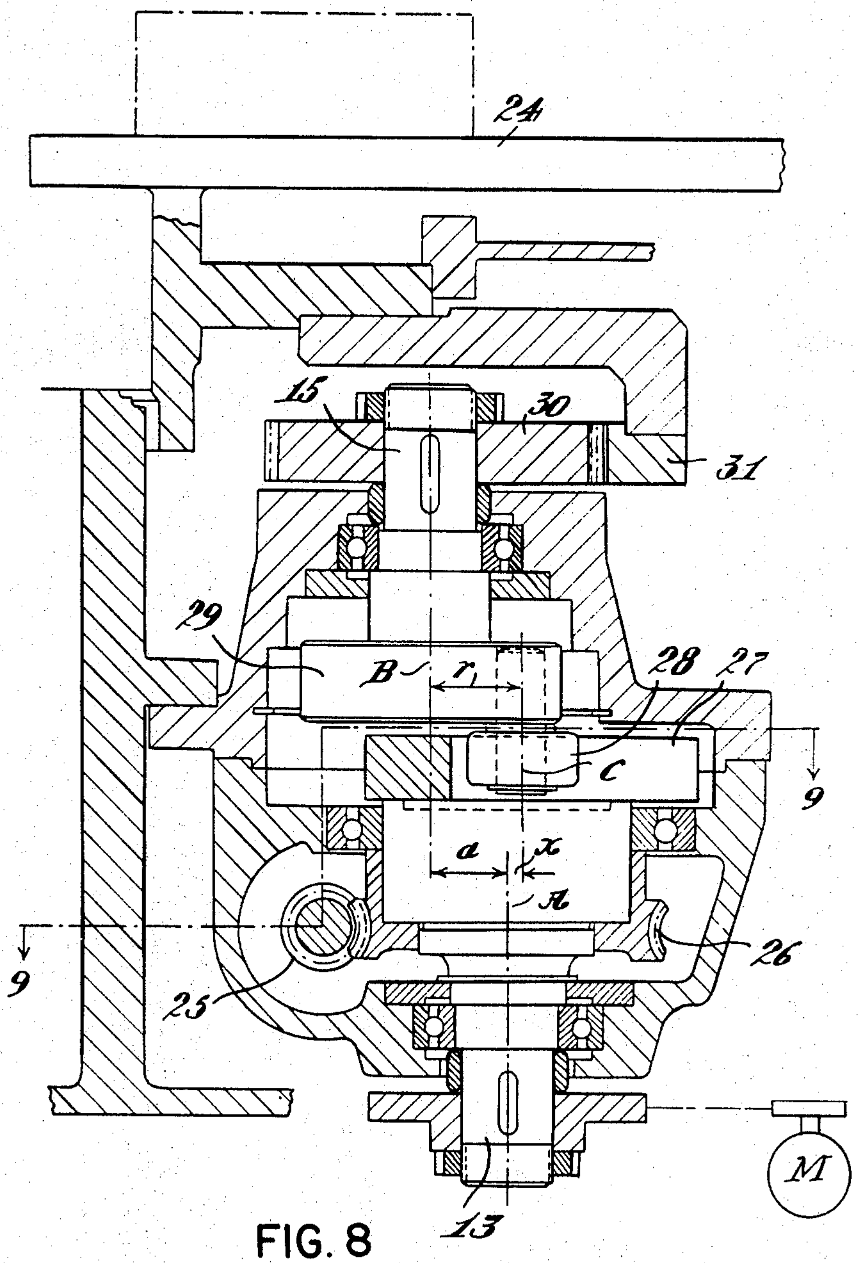
FIG. 8 shows the use of a gearing according to FIGS. 1–5 for example in an injection molding machine, in vertical section.
Figure 9:
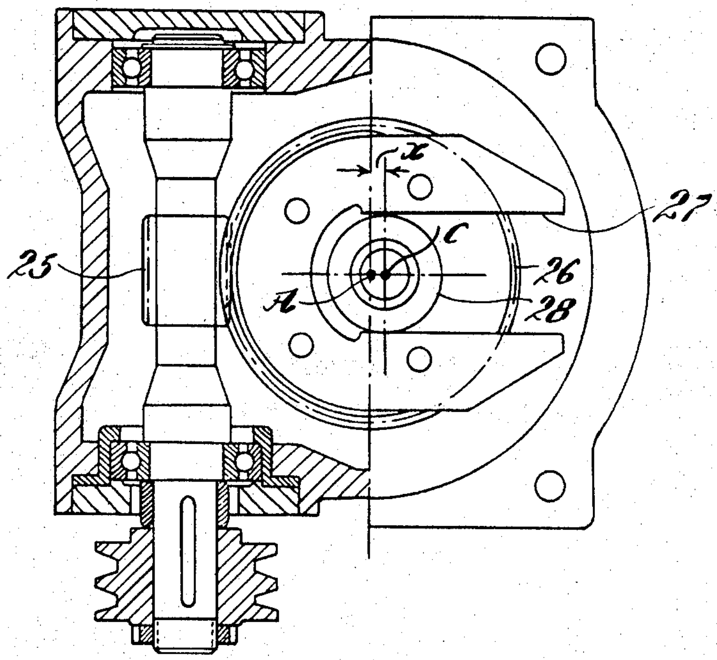
FIG. 9 shows a horizontal section along the line IX—IX in FIG. 8.
Figure 10:
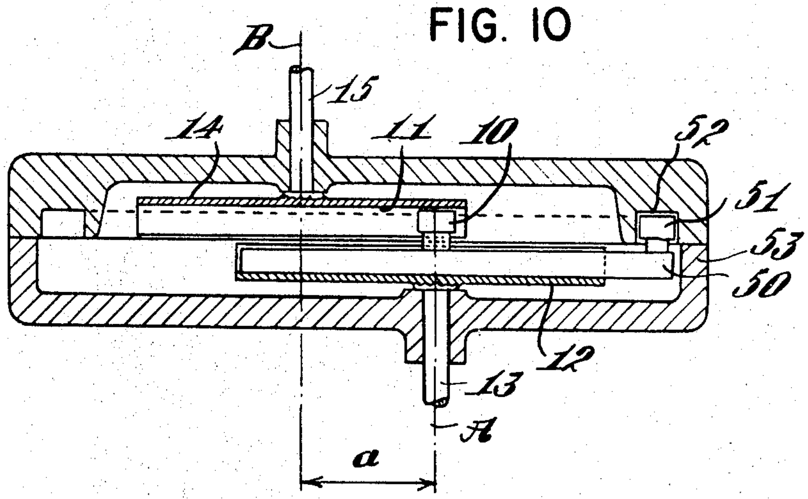
FIG. 10 shows a further form of embodiment of the gearing in diagrammatic cross-section.

In FIGS. 8, 9 and 10 the use of a gearing according to FIGS. 1 to 5 for the drive of a rotary platform 24 having several processing stations is represented diagrammatically. The uniform rotation drive of a drive motor M, shown diagrammatically in FIG. 9, is transmitted by a worm 25 to a worm wheel 26. A slot guide 27 is connected with the worm wheel 26. This horseshoe-shaped slot guide 27 serves to receive and guide a drive roller 28 which in turn is rotatably mounted on a drive output disc 29. The drive output disc 29 again is connected with a toothed wheel 30 which is in engagement with a toothed ring 31 mounted on the rotary platform 24. In this gearing again the equation $a+x=r$ is valid where $x$ in the initial position has a minimum size, but in every case is greater than zero.

The operationally synchronized rotation of the rotary platform 24 from working station to working station proceeds in a manner in which a revolution of the slot guide 27 and thus of the drive output disc 29 and of the toothed wheel 30 corresponds to one shift cadence of the rotary platform 24.

The advantage of the gearing according to the invention consists in that a favorable speed and acceleration characteristic is achieved with low acceleration and retardation at the beginning and end of the rotation cadence. In a gearing according to FIGS. 6 and 7 furthermore an actual zero position is achieved. Furthermore it is advantageous that the gearing possesses a simple assembly and is applicable for practically any desired number of processing stations of the rotary platform, with appropriate transmission ratio between toothed wheel 30 and toothed ring 31. However the gearing according to the invention will preferably be used in a range for which Maltese-cross gearings are unsuitable.

The gearing construction according to FIG. 10 is based on the form of embodiment according to FIGS. 6 and 7 in which an actual zero position is achieved at every movement cadence. While in the form of embodiment as explained according to FIGS. 6 and 7 an additional expensive intermediate gearing is necessary, in the case of the gearing embodiment according to FIG. 10 it is possible to dispense with this. In this gearing a drive roller 10 is arranged on a slide 50 which is displaceable in relation to and transversely of a drive input disc 12. The slide 50, which carries the drive roller 10, can be displaceable mounted on the drive input disc 12 for example with a slot or dovetail guide.

The drive roller 10 engages in a slot guide 11 of a drive output disc 14 and is moved back and forth in this slot guide 11 in the course of a movement cycle, analogously with the above-described gearing.

In the drawing the zero position of the gearing is shown in which the axis of the drive roller 10 lies coaxially with the rotation axis A of the drive input side, that is to say in which no drive can be transmitted. In order initially, at the beginning of a movement cycle, to provide an eccentricity of the drive roller 10 in relation to the rotation axis A, the slide 50 is shifted on the drive input disc 12.

The displacement of the slide 50 on the drive input disc 12 is controlled so that during the movement cadence an eccentricity of the drive roller 10 in relation to the rotation axis A is constantly given. After termination of a movement cycle the drive roller 10 again lies coaxially with the rotation axis A. For the execution of the slide movements a guide roller 51 is arranged on the slide 50. This guide roller 51 is guided in a guide groove 52 which in the example of embodiment as illustrated is part of a housing 53 surrounding the gearing. The guide groove 52 is arranged on the inner side of the housing wall and extends all round, preferably in circular form. The displacement of the slide 50 in relation to the drive input disc 12 is here achieved due to the fact that the rotation axis A on the drive input side lies eccentrically of the center point of the housing 53 or eccentrically of the center point of the guide groove 52. If at the commencement of a movement cycle the guide roller 51 is moved in the guide groove 52 by rotation of the drive input disc 12 about the rotation axis A, then a displacement of the slide 50 in relation to the rotation axis A positively takes place with the effect that the desired eccentricity of the drive roller 10 from the rotation axis A is obtained.

After the eccentricity of the drive roller 10 in relation to the rotation axis A on the drive input side is produced, the drive is transmitted as in the manner described in the previous gearing embodiments to the drive output rotation axis B lying at the distance *a* from the rotation axis on the drive input side, or the pertinent drive output shaft 15, the drive roller 10 however, in departure from the previous gearing embodiment, engaging in a slot guide 11 arranged on the drive output disc 14.

Figure 11:
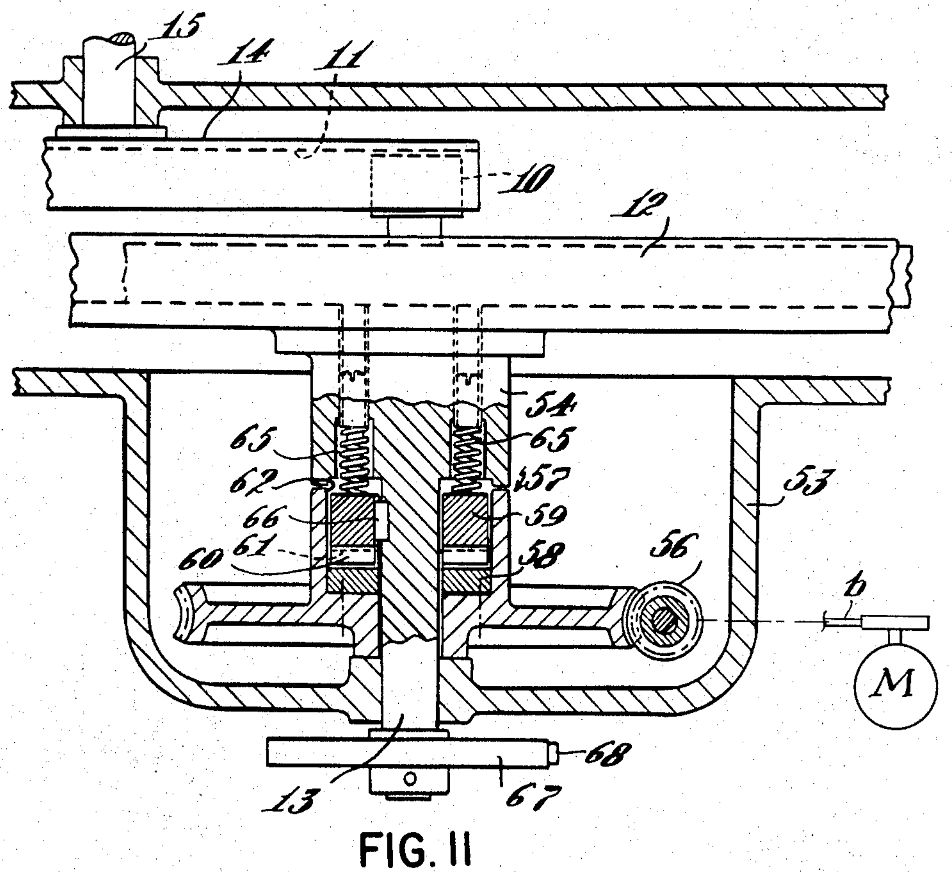
FIG. 11 shows further details of the gearing on an enlarged scale and in diagrammatic cross-section.

The form of embodiment according to FIG. 10 is distinguished by simple assembly and precise manner of working. Only a few movable parts are present. The manner of function is reliable. Furthermore the production of such a gearing is cheaper, since it is possible to dispense with an intermediate gearing for the displacement of the drive roller 10. The example of embodiment of a control gearing as illustrated in FIG. 11 is substantially based upon the described control gearing according to FIG. 10.

In a common housing 53 surrounding the gearing, a drive input disc 12 with drive roller 10 are mounted on a drive input shaft 13 which is conducted out of the housing 53. The drive roller 10 is guided in a slot guide 11 of a drive output disc 14. The drive output disc 14 again is mounted on a drive output shaft 15 also conducted out of the housing 53.

In amplification of the example of embodiment according to FIG. 10, the drive of the drive input shaft 13 is also illustrated. For this purpose the shaft 13 is provided with a neck extension 54 (FIG. 11) of widened cross-section, on the lower end of which a worm wheel 55 is mounted. The worm wheel 55 again is in engagement with a worm 56 which is driven by an electric motor M, shown (diagrammatically in FIG. 11, preferably through a V-belt drive.

A safety clutch 57 is arranged on the drive input side. For this purpose the neck extension 54 is divided into a clutch part 58 connected with the worm wheel 55 and a clutch part 59 connected with the drive input shaft 13 or the drive input disc 12. The safety clutch 57 is formed as tooth clutch. The mutually facing surfaces of the clutch parts 58 and 59 are provided with interengaging, radially directed coupling teeth 60 and 61.

The mutual engagement of the coupling teeth 60 and 61 is adjustable in such manner that a specific torque necessary for the drive of the rotary platform or the like is transmittable without movement of the clutch parts 58 and 59 in relation to one another. If the set critical torque is exceeded, for example on sudden halting of the moving rotary platform, the engagement of the coupling teeth 60 and 61 is to be removed and a relative movement is to take place between the clutch parts 58 and 59, in such manner that the considerable occurring forces, namely the elevated torques, cannot lead to fracture within the gearing or to undesired deformation of parts of the gearing, and further in such manner that despite the relative movement of the clutch parts 58 and 59 the zero point of the gearing is maintained in relation to the rotary platform.

According to the invention the lower clutch part 58 allocated to the worm wheel 55 is firmly connected with the worm wheel 55 and nondisplaceable in the longitudinal direction of the drive input shaft 13, but is rotatable on this drive input shaft 13. The clutch part 58 is arranged in a surrounding recess 62 in which the other clutch part 59 is also accommodated.

The upper clutch part 59 consists of a ring displaceable in the axial direction of the drive input shaft 13 and thus in relation to the lower clutch part 58, on the underside 64 of which ring the coupling teeth 60 in engagement with the coupling teeth 61 are arranged. The annular clutch part 59 is pressed by compression springs 65 onto the lower clutch part 58. The loading by the compression springs 65 is adjustable in a suitable manner so that the pressure application of the clutch part 59 against the clutch part 58 and thus the transmittable torque are adjustable. The annular clutch part 59 is mounted in a suitable manner on the drive input shaft 13 so that rotational movements can be transmitted, that is a relative rotational movement between the clutch part 59 and the drive input shaft 13 is avoided. The connection can be formed for example as key-groove connection 66.

In the case of overloading, that is to say in the case of exceeding of the set critical torque, the upper clutch part 59 is moved upwards against the loading of the compression springs 65 in such manner that the coupling teeth 60 and 61 come out of engagement and thus the transmission of the torque ceases.

According to a further essential feature of the invention a cam disc 67 is arranged on the lower end of the drive input shaft 13 protruding out of the housing 53. On this cam disc 67 inter alia a cam 68 is arranged which has the task of actuating an electric switch (not shown) exactly at the moment of the zero position of the drive output of the gearing, which switch again switches off the drive motor (not shown). The arrangement of the cam 68 on the drive input side achieves an increased accuracy of switching despite the predetermined inaccuracy in the ordinary switches. Further cams for the actuation of other switches can be arranged on the cam disc 67.

It should be understood that the present disclosure is for the purpose of illustration only and that this invention includes all modifications and equivalents falling within the scope of the appended claims.

We claim:

1. Indexing mechanism for effecting rotation of a horizontally disposed table mounted for rotation about a vertical axis comprising spaced parallel shafts mounted for rotation about spaced parallel axes, and means drivably interconnecting the shafts comprising a diametrically disposed guide fast to one shaft, a drive element, a movable holder mounting the drive element for linear movement along said guide and for angular movement with said guide about the axis of the one shaft when the latter is rotated, means operably connecting the drive element to said other shaft so that the combined linear and angular movement of the drive element will impart rotary movement to the other shaft, a fixed track extending around said shafts and a follower connecting the movable holder to the track, said track having a configuration such that the drive element is caused to have a position coaxial with the axis of rotation of the one shaft at the beginning of any rotation and to be displaced therefrom as it moves away from said position.

2. Indexing mechanism according to claim 1, wherein the track is circular and is eccentric to the axis of rotation of the one shaft such that the holder is displaced relative to the axis of the one shaft.

3. Indexing mechanism according to claim 1, wherein a disc is fixed to the one shaft and embodies a guide with which the slide is engaged.

4. Indexing mechanism according to claim 1, comprising a disc fixed to the other shaft, said disc containing a radial slot and wherein the drive element is engaged with the slot.

5. Indexing mechanism according to claim 1, comprising a housing supporting the indexing mechanism, said housing containing on its inner side said surrounding track.

6. Indexing mechanism for effecting rotation of a horizontally disposed table mounted for rotation about a vertical axis comprising spaced parallel shafts, bearings supporting said shafts for rotation, means drivably interconnecting said shafts comprising a diametrically disposed guide to one shaft, a drive element constrained to move linearly along said guide and angularly with said guide about the axis of said one shaft when the latter is rotated, means for adjusting said drive element realtive to the axis of rotation of said one shaft, and means operably connecting the drive element to said other shaft so that the combined linear and angular movement of the drive element will impart rotary movement to said other shaft.

7. Indexing mechanism according to claim 6, wherein said means for adjusting the drive element relative to the axis of rotation of the one shaft comprises an eccentric, and means connecting the eccentric to the drive element.

8. Indexing mechanism according to claim 7, wherein the means for adjusting said drive element relative to the axis of rotation of the one shaft comprises a gear coaxial with said other shaft, said gear supporting said eccentric, a gear coaxial with said one shaft, and a ring gear in mesh with both of said gears.

9. Indexing mechanism according to claim 6, comprising a drive motor connected to the one shaft to impart rotation thereto, a switch for effecting operation of the motor, and a cam associated with the one shaft and operable thereby to stop the motor.

10. Indexing mechanism according to claim 6, comprising a drive motor connected to the one shaft to impart rotation thereto, a switch for effecting operation of the motor, a cam disc fixed to the one shaft for rotation therewith, and one or more cams on the disc for effecting operation of said switch.

11. Indexing mechanism according to claim 6, comprising means for driving said one shaft and an adjustable safety clutch interposed between said driving means and said one shaft.

12. Indexing mechanism according to claim 6, comprising means for effecting rotation of the one shaft, and a safety clutch interposed between the driving means and the shaft, said safety clutch embodying clutch parts having teeth yieldably held interengaged with each other.

13. Indexing mechanism according to claim 6, comprising a worm wheel, clutch parts fixed respectively to the worm wheel and to said one shaft, and means yieldably holding the clutch parts engaged for transmitting rotation of the worm wheel to said one shaft.

14. Indexing mechanism according to claim 13, comprising a plurality of springs yieldably holding the clutch parts together and means for adjusting the compression of the spring.

15. Indexing mechanism for effecting rotation of a horizontally disposed table mounted for rotation about a vertical axis comprising spaced parallel shafts, one of which is an input shaft and the other of which is an output shaft, a first gear fixed to the input shaft, said first gear containing a diametrical slot, a second gear supported in spaced parallel relation to the first gear for rotation about the axis of the output shaft, an eccentric mounted on the second gear, an arm fixed at one end to the eccentric and extending laterally therefrom, a spindle rotatably mounted at the distal end of the arm, a journal mounted at one end of the spindle in engagement with the slot, a disc fixed to the output shaft containing a radial slot, said second gear containing an opening through which the spindle extends into engagement with said radial slot, and a ring gear supported in mesh with said first and second gears operable by rotation to effect relative rotation of said gears and hence radial displacement of the journal.

16. Indexing mechanism for effecting rotation of a horizontally disposed table about a vertical axis comprising an index mechanism supporting housing, spaced parallel input and output shafts journaled in said housing for rotation about spaced parallel axes, a disc fixed to each shaft within the housing, said discs being situated in spaced parallel relation and each containing a diametrical slot, an elongate bar slidably mounted in the slot in the disc fixed in the input shaft, a pin fixed to said bar and extending into the slot in the disc fixed to the output shaft, a first journal rotatably mounted on the first pin in engagement with said latter slot, said housing having internally thereof and surrounding the shafts a continuous groove, a second pin fixed to the bar in spaced relation to the first pin, and a second journal mounted on said second pin in engagement with said continuous groove.

17. Indexing mechanism for effecting rotation of a horizontally disposed table about a vertical axis, comprising a supporting frame, spaced parallel shafts rotatably mounted in said frame for rotation about spaced parallel axes, a diametrically disposed channeled member fixed to each shaft, said channeled members being situated in spaced parallel relation to each other, a bar slidably mounted in the channeled member fixed to the input shaft, a pin fixed to the bar and extending therefrom into the channeled member fixed to the output shafts, a journal rotaably mounted on the pin in engagement with the latter channeled member, and means for effecting rotation of the input shaft comprising a worm wheel rotatably mounted on the input shaft, and a clutch interposed between the worm wheel and the input shaft, said clutch having interengaged parts normally held engaged to transmit rotation of the worm wheel to the input shaft.

References Cited

UNITED STATES PATENTS

| | | | |
|---|---|---|---|
| 2,971,489 | 2/1961 | Loser | 74—69 |
| 2,748,610 | 6/1956 | Schatzel | 74—69 |

FOREIGN PATENTS

| | | |
|---|---|---|
| 135,234 | 11/1901 | Germany. |
| 148,052 | 8/1919 | Great Britian. |
| 1,220,758 | 1/1960 | France. |

WESLEY S. RATLIFF, Jr., Primary Examiner